US012756263B2

(12) United States Patent
Kim et al.

(10) Patent No.: US 12,756,263 B2
(45) Date of Patent: Oct. 6, 2026

(54) OMNIDIRECTIONAL COOLING GUIDE

(71) Applicant: HYUNDAI MOBIS CO., LTD., Seoul (KR)

(72) Inventors: Sang Jin Kim, Yongin-si (KR); Jeong Min Moon, Suwon-si (KR); Dong Uk Jeong, Seoul (KR); Goon Chul Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 198 days.

(21) Appl. No.: 18/440,245

(22) Filed: Feb. 13, 2024

(65) Prior Publication Data

US 2024/0322639 A1 Sep. 26, 2024

(30) Foreign Application Priority Data

Mar. 22, 2023 (KR) ........................ 10-2023-0037210

(51) Int. Cl.
*H02K 5/20* (2006.01)

(52) U.S. Cl.
CPC .................................... *H02K 5/203* (2021.01)

(58) Field of Classification Search
CPC ...................................................... H02K 5/203
See application file for complete search history.

(56) References Cited

U.S. PATENT DOCUMENTS 4,383,191 A * 5/1983 Mizuyama ............... H02K 9/18 310/59
7,397,154 B2 * 7/2008 Tilton ...................... H02K 5/18 310/64
12,311,768 B2 * 5/2025 Baillie ................. B60K 7/0007
2022/0209618 A1 * 6/2022 Ziskovsky ............... H02K 9/19
2023/0213222 A1 * 7/2023 Eiserer .................. E04H 1/1205 62/89
2024/0186855 A1 * 6/2024 Brunberg ................. H02K 9/19
2024/0297554 A1 * 9/2024 Wang ..................... H02K 5/203

FOREIGN PATENT DOCUMENTS

EP 4518105 A1 * 3/2025 ............ H02K 1/185
KR 10-2021-0026357 A 3/2021

* cited by examiner

*Primary Examiner* — Forrest M Phillips
(74) *Attorney, Agent, or Firm* — Morgan, Lewis & Bockius LLP

(57) ABSTRACT

Provided is an omnidirectional cooling guide which is attached to the inside of a motor housing to guide a flow direction of cooling oil, the cooling guide comprising: an insert part extending around a motor axis while having an arc shape, one end of two ends of the insertion part inserted into the motor housing and a guide part extending from the other end of the two ends of the insertion part and guiding a spray direction of cooling oil toward a coil by colliding with cooling oil flowing between the motor housing and a stator, the insertion part is applied to an entire circumference of the motor housing in a radial direction.

9 Claims, 10 Drawing Sheets

[FIG. 1]
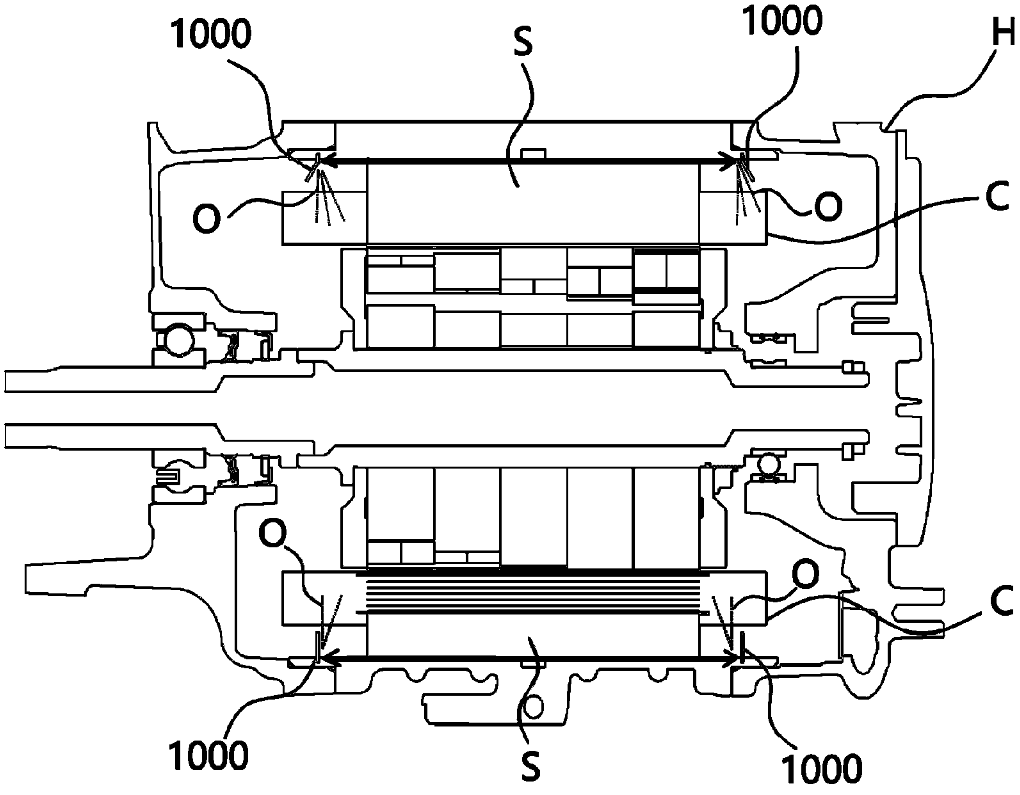

[FIG. 2]
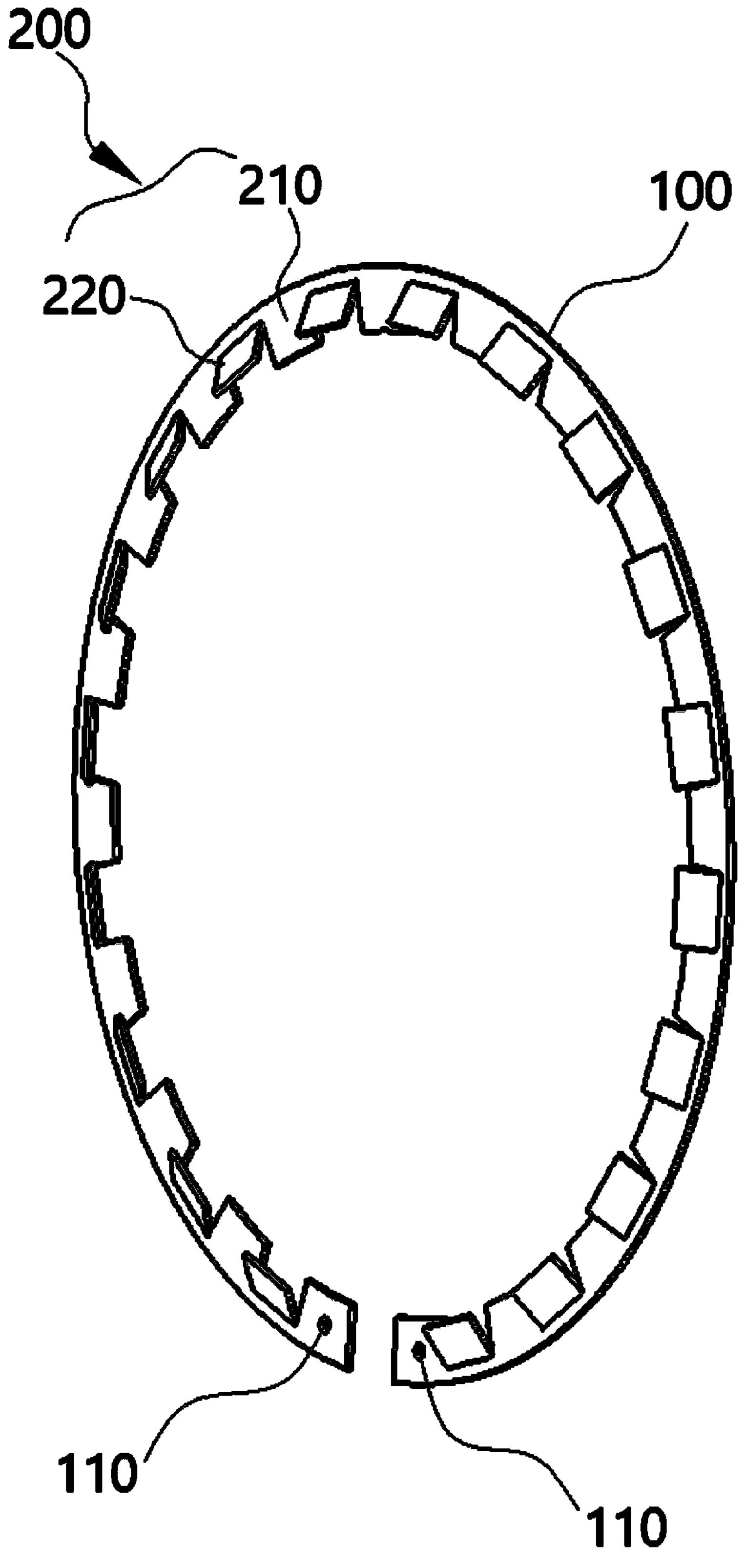

[FIG. 3]
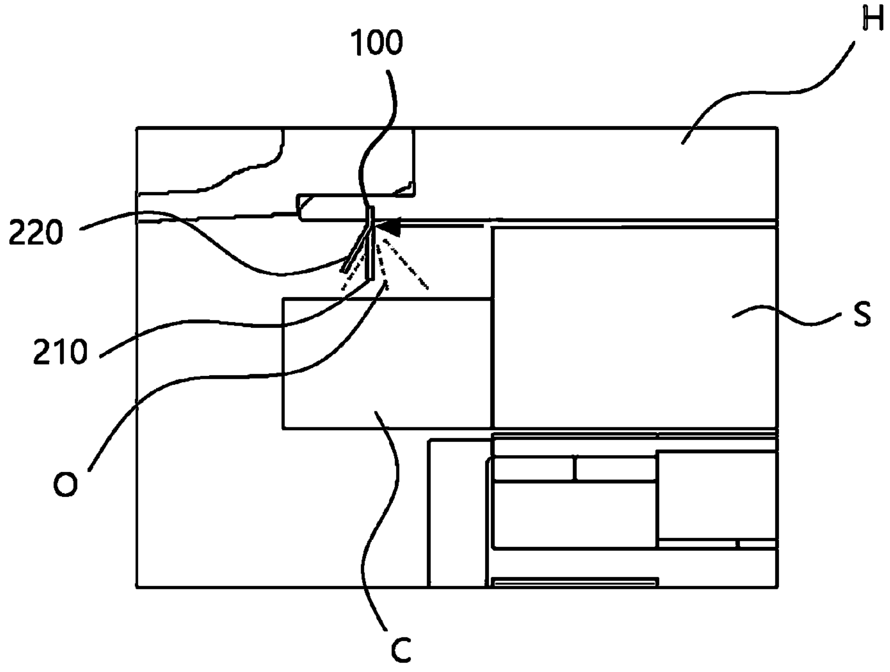

[FIG. 4]
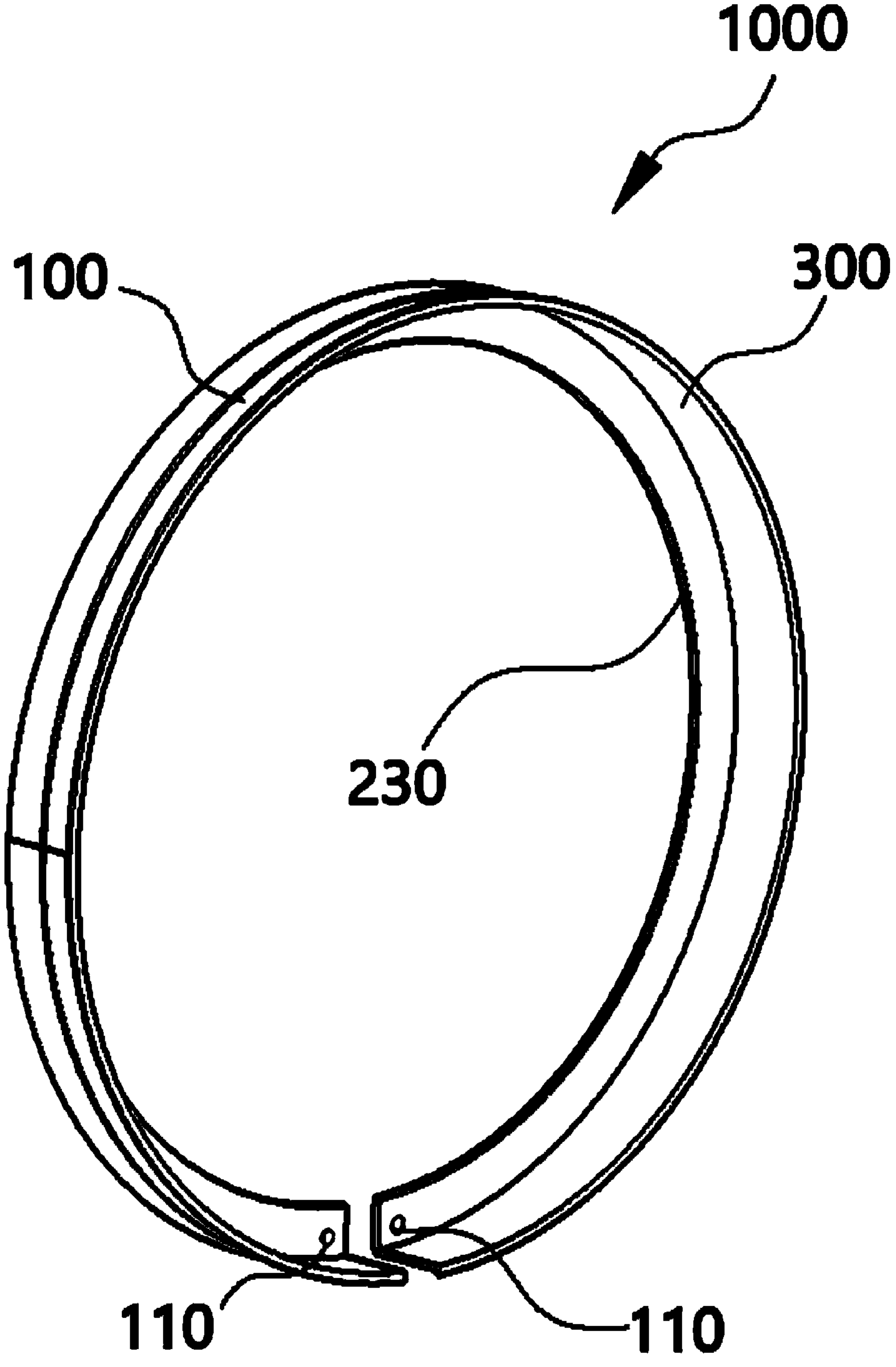

[FIG. 5]
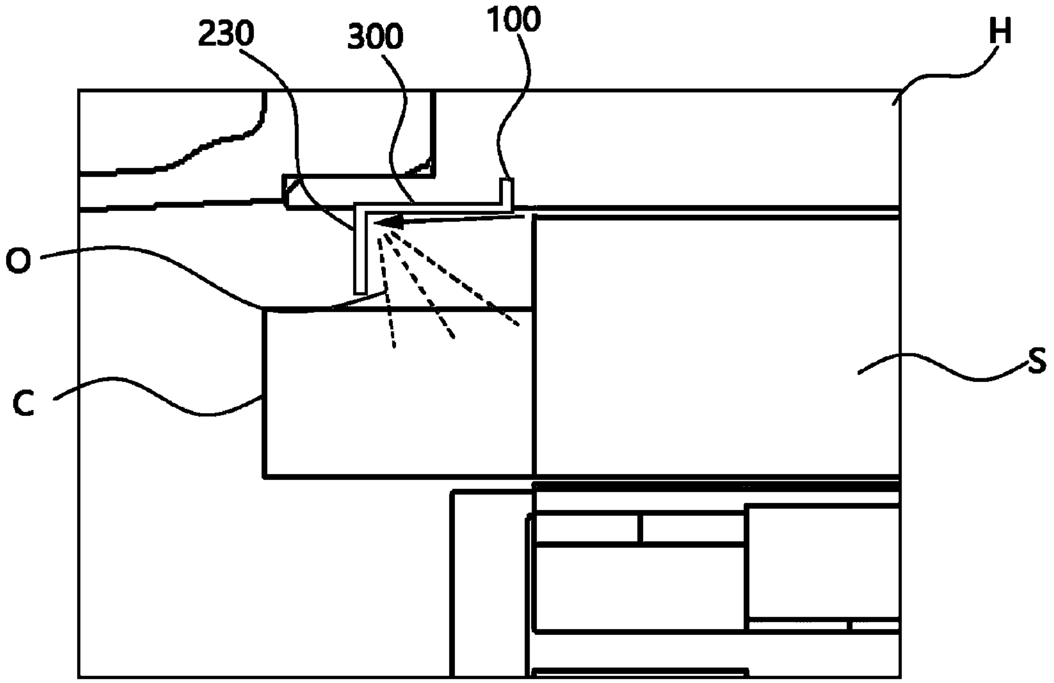

[FIG. 6]
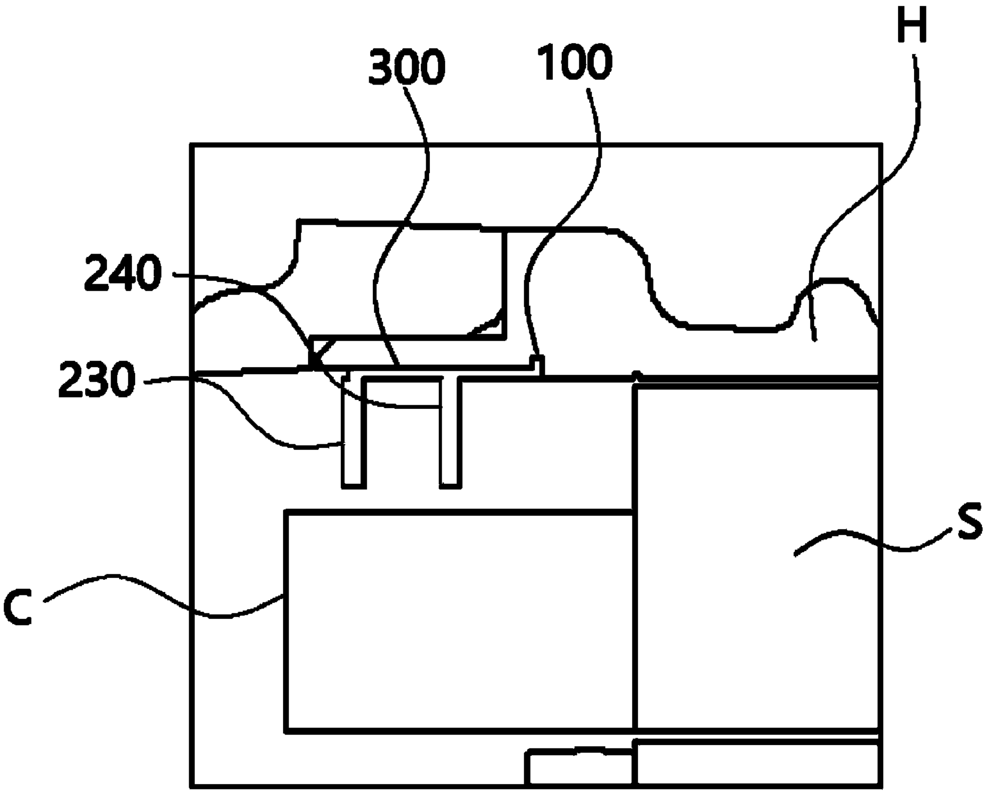

[FIG. 7]
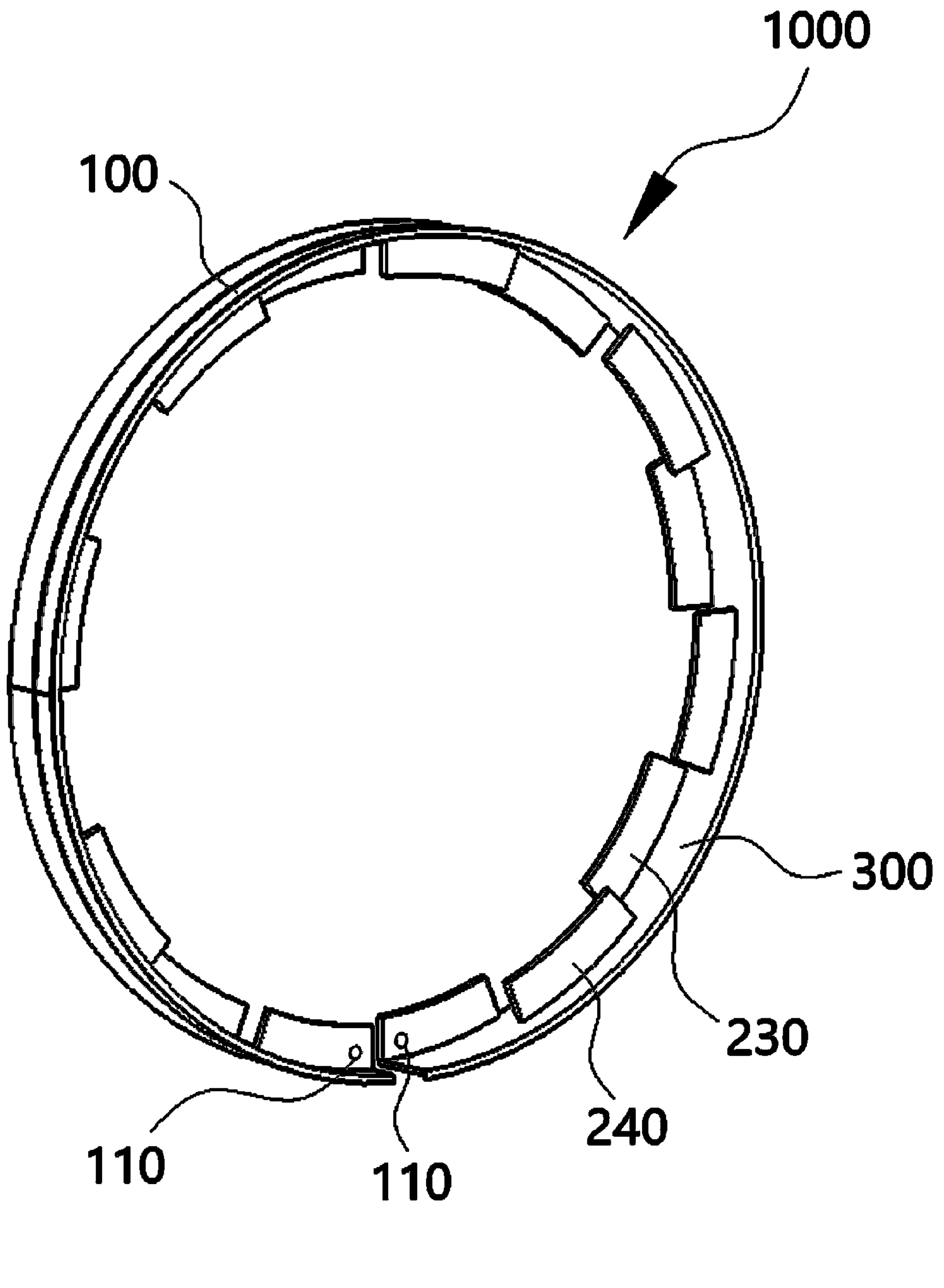

[FIG. 8]
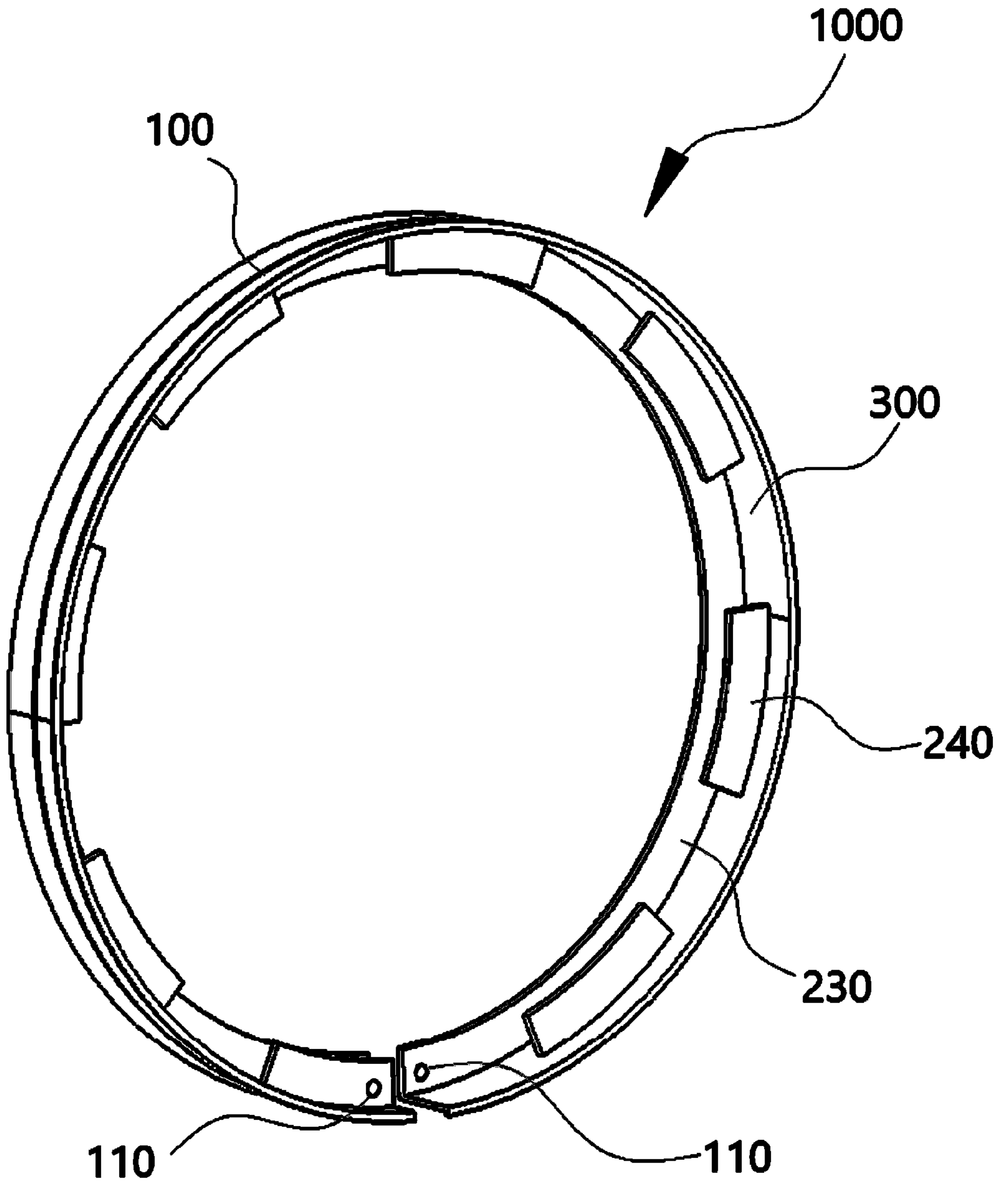

[FIG. 9]
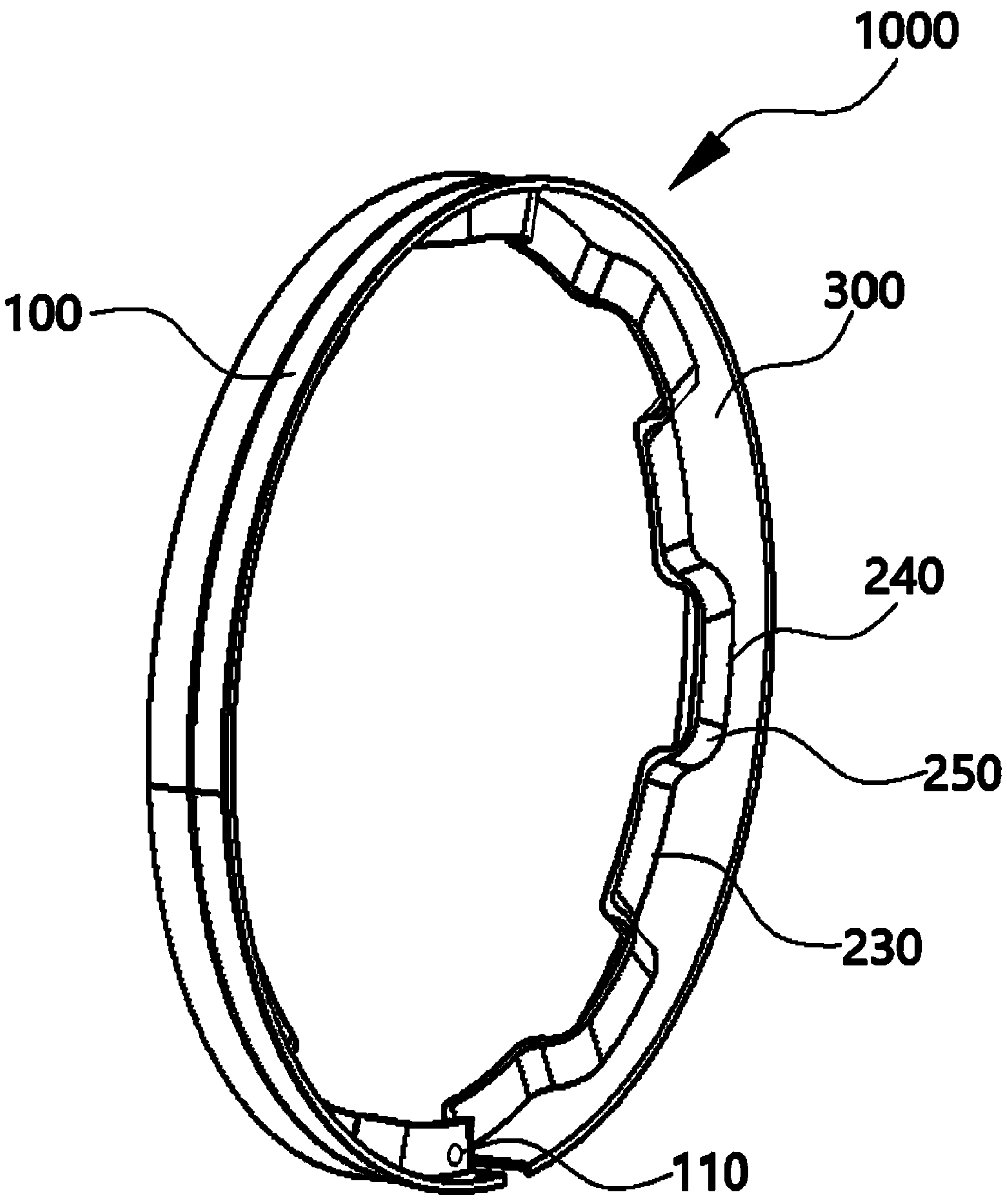

[FIG. 10]
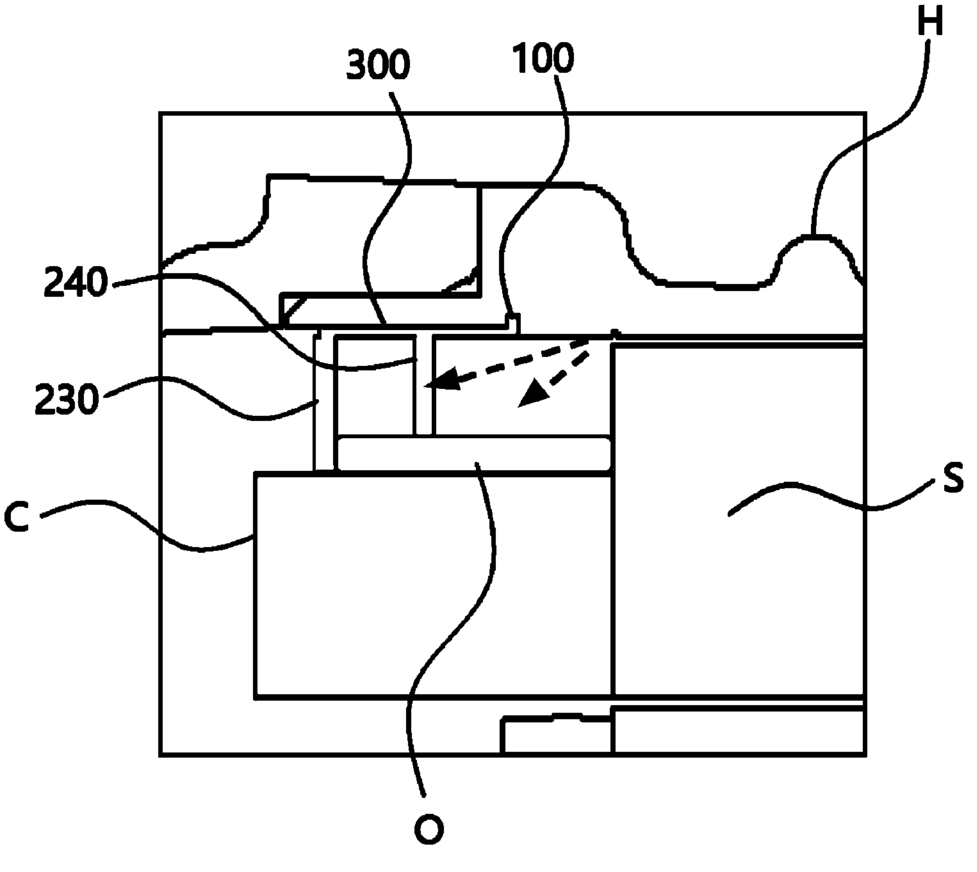

OMNIDIRECTIONAL COOLING GUIDE

CROSS-REFERENCE TO RELATED APPLICATIONS

This application claims priority under 35 U.S.C. § 119 to Korean Patent Application No. 10-2023-0037210, filed on Mar. 22, 2023 in the Korean Intellectual Property Office, the disclosure of which is incorporated herein by reference in its entirety.

TECHNICAL FIELD

The following disclosure relates to a cooling guide for optimally delivering cooling oil.

BACKGROUND

In a conventional oil-cooled motor in which cooling oil is injected into a motor housing to cool a coil positioned in the motor, a groove may be formed in a stator core (or a stator), cooling oil may be injected into a gap between the stator and the motor housing, or an oil pipe may be positioned on a side of the stator, thereby allowing cooling oil to flow into the motor housing. Here, a cooling guide plate may be installed to correspond to the groove of the stator for sprayed oil to be directed to the coil, and as a result, cooling oil may be induced to flow toward the coil by colliding with the cooling guide plate.

However, a conventional cooling guide plate is made of a material with little elasticity, and it may be difficult to adjust a shape this guide plate, resulting in many interference parts between the commonly used motor housing and its accessories, and was difficult to assemble the housing and its accessories together. Accordingly, when the cooling guide plate is installed only on a part of the motor housing, that is, on an upper part of the motor housing for convenience, cooling oil introduced from a lower part of the motor housing may not be sprayed toward the coil, thus failing to smoothly cool the coil.

In addition, the conventional cooling guide plate may be flat without a curve, oil colliding with the plate may not be widely distributed and sprayed only to a local position of the coil, which may result in lower cooling efficiency. In addition, the conventional cooling guide plate assembled to a side of a front cover with a bolt may leads to a larger size of a cooling guide and severe material wastes.

RELATED ART DOCUMENT

Patent Document (Patent Document 1) Korean Patent Laid-Open Publication No. 10-2021-0026357 "Motor provided with cooling system" (published on Mar. 10, 2021)

SUMMARY

An embodiment of the present disclosure is directed to providing an omnidirectional cooling guide which is made of an elastic material and has a c-ring shape with one side open to be mounted on a motor housing structure without any interference, thereby directing cooling oil flowing from both of the upper and lower parts of the motor housing to an end coil of a motor and maximizing cooling efficiency of the coil.

Another embodiment of the present disclosure is directed to providing an omnidirectional cooling guide which is partially bent or has a plurality of stages to expand a spray range of cooling oil, thereby increasing cooling efficiency.

Another embodiment of the present disclosure is directed to providing an omnidirectional cooling guide which may be assembled to a motor housing by having one end inserted into a groove of the motor housing, thereby reducing material wastes and increasing manufacturing convenience.

In one general aspect, provided is an omnidirectional cooling guide which is attached to the inside of a motor housing to guide a flow direction of cooling oil, the cooling guide including: an insertion part having one end inserted into the motor housing and extending around a motor axis while having an arc shape; and a guide part extending from the other end of the insertion part and guiding a spray direction of cooling oil toward a coil by colliding with cooling oil flowing between the motor housing and a stator, wherein the insertion part is applied to an entire circumference of the motor housing in a radial direction.

The insertion part may be made of an elastic material, and include a fastening hole passing through each of the two ends of the insertion part.

The guide part may include a plurality of first guides guiding cooling oil in a first predetermined direction, and a plurality of second guides guiding cooling oil in a second direction different from the first direction, and the first direction and the second direction may be different from each other.

The first guide may extend in a vertical direction from the insertion part to an inner surface of the motor housing, and the second guide may extend while being bent by a predetermined angle from the insertion part to the inner surface of the motor housing, and be inclined in a direction opposite to the stator.

The cooling guide may further include an auxiliary support part having one end integrally connected to the insertion part and the other end connected to the guide part, and extending in an axial direction of the motor, wherein the guide part includes a third guide extending from the other end of the auxiliary support part in the radial direction of the motor.

The guide part may further include a fourth guide extending from a point between one end and the other end of the auxiliary support part in the radial direction of the motor, and an extension length of the fourth guide may be shorter than an extension length of the third guide.

The fourth guides may be spaced apart from each other by a predetermined distance in an extension direction of the insertion part.

The third guides may be spaced apart from each other by a predetermined distance in the extension direction of the insertion part, and positioned in an area that does not correspond to a position where the fourth guide is positioned.

The guide part may include a connection guide disposed between the third guide and the fourth guide to connect the third guide and the fourth guide with each other.

The third guide may extend over to the other end of the auxiliary support part.

BRIEF DESCRIPTION OF THE DRAWINGS

FIG. 1 is a cross-sectional view showing an internal structure of a motor to which an omnidirectional cooling guide of the present disclosure is applied.

FIG. 2 is a perspective view showing a first embodiment of the omnidirectional cooling guide of the present disclosure.

FIG. 3 is a schematic view showing a first embodiment of the omnidirectional cooling guide of the present disclosure.

FIG. 4 is a perspective view showing a second embodiment of the omnidirectional cooling guide of the present disclosure.

FIG. 5 is a schematic view showing a second embodiment of the omnidirectional cooling guide of the present disclosure.

FIG. 6 is a schematic view showing third to fifth embodiments of the omnidirectional cooling guide of the present disclosure.

FIG. 7 is a perspective view showing a third embodiment of the omnidirectional cooling guide of the present disclosure.

FIG. 8 is a perspective view showing a fourth embodiment of the omnidirectional cooling guide of the present disclosure.

FIG. 9 is a perspective view showing a fifth embodiment of the omnidirectional cooling guide of the present disclosure.

FIG. 10 is a schematic view showing a sixth embodiment of the omnidirectional cooling guide of the present disclosure.

DETAILED DESCRIPTION OF EMBODIMENTS

Hereinafter, the spirit of the present disclosure is described in more detail with reference to the accompanying drawings. Prior to the description, terms and words used in the specification and claims are not to be construed as general or dictionary meanings, and are to be construed as meanings and concepts meeting the spirit of the present disclosure based on a principle in which the inventors may appropriately define the concepts of the terms in order to describe their inventions in the best mode.

Hereinafter, a first an embodiment of an omnidirectional cooling guide 1000 of the present disclosure and its coupling relationship with a motor are described with reference to FIGS. 1 to 3.

As shown in FIG. 1, the omnidirectional cooling guide 1000 of the present disclosure may be attached to the inside of a motor housing H to guide a flow direction of cooling oil O. In more detail, the omnidirectional cooling guide 1000 of the present disclosure may include an insertion part 100 and a guide part 200. The insertion part 100 may have one end inserted into the motor housing H, and as shown in FIG. 2, the insertion part 100 may extend around a motor axis while having an arc shape, that is, a C-shaped ring shape. The insertion part 100 may be applied to an entire circumference of the motor housing H in a radial direction. The insertion part 100 may be made of an elastic material, thus minimizing interference of the omnidirectional cooling guide 1000 of the present disclosure with the motor housing H, and applying the omnidirectional cooling guide 1000 of the same standard regardless of a length of the motor housing H in the radial direction. That is, it is possible to increase the utilization and applicability of the omnidirectional cooling guide 1000.

In addition, the insertion part 100 may have a fastening hole 110 for fixing a position of the insertion part 100 that passes through each of the two ends of the insertion part 100. The position of the omnidirectional cooling guide 1000 may be more stably fixed by a structure of the motor housing H passing through the fastening hole 110.

In addition, the guide part 200 may extend from the other end of the insertion part 100, and guide a spray direction of cooling oil O toward a coil C by colliding with cooling oil O flowing between the motor housing H and a stator S. The guide part 200 may be made of an elastic material, and may be made of a material with the same or higher strength than the insertion part 100 to accurately guide cooling oil O. A strength of the guide part 200 may be appropriately modified and initiated by a user based on a spray strength of cooling oil O. In addition, a surface of the guide part 200 may be coated with an insulating layer 260 to thus prevent a safety accident from occurring due to an unnecessary short circuit.

As described above, the omnidirectional cooling guide 1000 of the present disclosure may be installed on both of the upper and lower parts of the motor housing H, thus smoothly cooling the end coil C positioned under the motor. That is, it is possible to maximize a cooling effect of the end coil C.

In a first embodiment of the omnidirectional cooling guide 1000 shown in FIG. 3, the guide part 200 may include a plurality of first guides 210 guiding cooling oil O in a first predetermined direction and a plurality of second guides 220 guiding cooling oil O in a second direction different from the first direction. Here, the first direction and the second direction may be different from each other. In more detail, the first guide 210 may extend in a vertical direction from the insertion part 100 to an inner surface of the motor housing H, and the second guide 220 may extend while being be bent by a predetermined angle from the insertion part 100 to the inner surface of the motor housing H, and be inclined in a direction opposite to the stator S. Here, directions in which the different second guides 220 guide cooling oil O, that is, the second directions may be different from each other. For example, the second guide 220 installed on a side of an inlet through which cooling oil O flows may be more inclined outward relative to the motor axis than the other second guides 220. By configuring the guide part 200 in this way, cooling oil O may be uniformly sprayed on an outer circumferential surface of the end coil C.

Hereinafter, a second embodiment of the omnidirectional cooling guide 1000 of the present disclosure is described with reference to FIGS. 4 and 5.

In a second embodiment of the omnidirectional cooling guide 1000 of the present disclosure shown in FIG. 4, the omnidirectional cooling guide 1000 may further include an auxiliary support part 300 having one end integrally connected to the insertion part 100 and the other end connected to the guide part 200, and extending in an axial direction of the motor. Here, the guide part 200 may include a third guide 230 extending from the other end of the auxiliary support 300 in the radial direction of the motor. Accordingly, as shown in FIG. 5, a position where the insertion part 100 and the motor housing H are coupled with each other and a position where cooling oil O collides with the guide part 200 may be spaced apart from each other by a length of the auxiliary support part 300, thus widening an area where cooling oil O is sprayed on the outer circumferential surface of the end coil C by the spaced length.

Hereinafter, third to fifth embodiments of the omnidirectional cooling guide 1000 of the present disclosure are described with reference to FIGS. 6 to 10.

As shown in FIG. 6, the guide part 200 may further include a fourth guide 240 extending from a point between one end and the other end of the auxiliary support part 300 in the radial direction of the motor. As the guide part 200 includes the fourth guide, cooling oil O may collide with the guide part 200 twice and cooling oil O may be dispersed over a wider area.

In more detail, in a third embodiment of the omnidirectional cooling guide 1000 of the present disclosure shown in FIG. 7, the fourth guides 240 may be spaced apart from each other by a predetermined distance in an extension direction of the insertion part 100. Here, the third guides 230 may be spaced apart from each other by a predetermined distance in the extension direction of the insertion part 100, and positioned in an area that does not correspond to a position where the fourth guide 240 is positioned. That is, when observing the guide part 200 in the axial direction of the motor, the third guide 230 and the fourth guide 240 may be alternately disposed in the radial direction of the motor. Accordingly, the third guide 230 and the fourth guide 240 may interfere with each other, thus dispersing cooling oil O in a wider range.

In addition, in a fourth embodiment of the omnidirectional cooling guide 1000 of the present disclosure shown in FIG. 8, the fourth guides 240 may be spaced apart from each other by a predetermined distance in the extension direction of the insertion part 100. In addition, the third guide 230 may extend over to the other end of the auxiliary support part 300. Accordingly, the third guide 230 and the fourth guide 240 may interfere with each other, thus dispersing cooling oil O in a wider range. A fourth embodiment may have a degree of interference higher than that of the third embodiment, and may thus be applied to a case where cooling oil O has a higher flow rate.

In addition, in a fifth embodiment of the omnidirectional cooling guide 1000 of the present disclosure shown in FIG. 9, the guide part 200 may include a connection guide disposed between the third guide 230 and the fourth guide 240 to connect the third guide 230 and the fourth guide 240 with each other. Here, the fourth guides 240 may be spaced apart from each other by a predetermined distance in the extension direction of the insertion part 100, and the third guides 230 may be spaced apart from each other by a predetermined distance in the extension direction of the insertion part 100 and positioned in an area that does not correspond to the position where the guide 240 is positioned. That is, the third guide 230 and the fourth guide 240 may be alternately disposed in a zigzag shape.

In addition, a connection guide 250 connecting the third guide 230 and the fourth guide 240 with each other may be bent while having a predetermined curvature. That is, the connection guide 250 may not have an edge which is a narrow space. Accordingly, cooling oil O may not remain on the connection guide 250, which may minimize contamination of the guide part 200.

Furthermore, each of the third guide 230, the fourth guide 240, and the connection guide 250 may be thinner toward its distal end. Accordingly, cooling oil O may be induced to be sprayed more widely from a distal end of the guide part 200.

In addition, in a sixth embodiment of the omnidirectional cooling guide 1000 of the present disclosure shown in FIG. 10, an extension length of the fourth guide 240 may be shorter than an extension length of the third guide 230. In addition, the fourth guide 240 may extend for its distal end to be in contact with the end coil C or spaced minutely apart from the end coil C to an extent that cooling oil O may form a surface tension. Accordingly, cooling oil O may remain in a space formed between the fourth guide 240, the stator S and the end coil C for a certain period of time, thereby maximizing the cooling effect of the end coil C.

The respective embodiments of the omnidirectional cooling guide 1000 described above may be used together based on a purpose. For example, a first embodiment of the omnidirectional cooling guide 1000 may be disposed at one end of the stator S, and an embodiment different from a first embodiment of the omnidirectional cooling guide 1000, for example, a fourth embodiment, may be disposed at the other end of the same stator S.

As set forth above, the omnidirectional cooling guide of the present disclosure may be made of the elastic material and have the c-ring shape with one side open to be mounted on the motor housing structure without interference, thereby directing cooling oil flowing from both of the upper and lower parts of the motor housing to the end coil of the motor and maximizing the cooling efficiency of the coil.

In addition, the omnidirectional cooling guide of the present disclosure may be partially bent or have the plurality of stages to expand the spray range of cooling oil, thereby increasing cooling efficiency.

In addition, the omnidirectional cooling guide of the present disclosure may be assembled to the motor housing by having one end inserted into the groove of the motor housing, thereby reducing the material wastes and increasing the manufacturing convenience.

The spirit of the present disclosure should not be interpreted as being limited to the embodiments described above. The present disclosure may be applied to various fields and may be variously modified by those skilled in the art without departing from the scope of the present disclosure claimed in the claims. Therefore, it is obvious to those skilled in the art that these alterations and modifications fall within the scope of the present disclosure.

What is claimed is:

1. An omnidirectional cooling guide which is attached to inside of a motor housing to guide a flow direction of cooling oil, the cooling guide comprising:

an insertion part extending around a motor axis while having an arc shape, one end of two ends of the insertion part inserted into the motor housing; and a guide part extending from the other end of the two ends of the insertion part and guiding a spray direction of the cooling oil toward a coil by colliding with the cooling oil flowing between the motor housing and a stator, wherein the insertion part is applied to an entire circumference of the motor housing in a radial direction, wherein the guide part includes: a plurality of first guides configured to guide the cooling oil in a first predetermined direction and a plurality of second guides configured to simultaneously guide the cooling oil in a second direction different from the first direction and the first direction and the second direction are different from each other.

2. The cooling guide of claim 1, wherein the insertion part is made of an elastic material, and includes a fastening hole passing through each of the two ends of the insertion part.

3. The cooling guide of claim 1, wherein the first guide extends in a vertical direction from the insertion part to an inner surface of the motor housing, and the second guide extends while being bent by a predetermined angle from the insertion part to the inner surface of the motor housing, and is inclined in a direction opposite to the stator.

4. The cooling guide of claim 1, further comprising: an auxiliary support part having one end integrally connected to the insertion part and the other end connected to the guide part, and extending in an axial direction of the motor, wherein the guide part includes a plurality of third guides extending from the other end of the auxiliary support part in the radial direction of the motor.

5. The cooling guide of claim 4, wherein the guide part further includes a plurality of fourth guides extending from a point between one end and the other end of the auxiliary support part in the radial direction of the motor, and an extension length of a fourth guide of the plurality of fourth guides is shorter than an extension length of a third guide of the plurality of third guides.

6. The cooling guide of claim 5, wherein the plurality of fourth guides are spaced apart from each other by a predetermined distance in an extension direction of the insertion part.

7. The cooling guide of claim 6, wherein the plurality of third guides are spaced apart from each other by a predetermined distance in the extension direction of the insertion part, and the third guide of the plurality of third guides positioned in an area that does not correspond to a position where the fourth guide of the plurality of fourth guides is positioned.

8. The cooling guide of claim 7, wherein the guide part includes a connection guide disposed between the third guide of the plurality of third guides and the fourth guide of the plurality of fourth guides to connect the third guide of the plurality of third guides and the fourth guide of the plurality of fourth guides with each other.

9. The cooling guide of claim 6, wherein the third guide of the plurality of third guides extends over to the other end of the auxiliary support part.

* * * * *